United States Patent
Naito

(10) Patent No.: US 11,549,033 B2
(45) Date of Patent: Jan. 10, 2023

(54) COATING AGENT, PROCESS OF FORMING COATING FILMS, PRIMER TREATMENT PROCESS, PROCESS OF REPAIRING CONCRETES, AND PROCESS OF CONSTRUCTING ROADS

(71) Applicant: NATIONAL INSTITUTE FOR MATERIALS SCIENCE, Tsukuba (JP)

(72) Inventor: Masanobu Naito, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 489 days.

(21) Appl. No.: 16/624,655

(22) PCT Filed: Aug. 21, 2018

(86) PCT No.: PCT/JP2018/030880
§ 371 (c)(1),
(2) Date: Dec. 19, 2019

(87) PCT Pub. No.: WO2019/039482
PCT Pub. Date: Feb. 28, 2019

(65) Prior Publication Data
US 2020/0131398 A1 Apr. 30, 2020

(30) Foreign Application Priority Data
Aug. 22, 2017 (JP) .............................. JP2017-159233

(51) Int. Cl.
*C09D 171/12* (2006.01)
*C04B 41/45* (2006.01)
(Continued)

(52) U.S. Cl.
CPC ............ *C09D 171/12* (2013.01); *C04B 41/45* (2013.01); *C09D 5/002* (2013.01); *C08K 5/0025* (2013.01);
(Continued)

(58) Field of Classification Search
CPC ............ C04B 41/45; C08K 5/17; C08K 5/138
See application file for complete search history.

(56) References Cited

U.S. PATENT DOCUMENTS 5,928,418 A * 7/1999 Tamaki ................. C08L 95/005
427/249.7
5,954,867 A * 9/1999 Chow ..................... A61K 6/838
106/35

(Continued)

FOREIGN PATENT DOCUMENTS

EP 2762171 A1 8/2014
EP 2950830 A1 12/2015
(Continued)

OTHER PUBLICATIONS

PCT/ISA/210, "International Search Report for International Application No. PCT/JP2018/030880," dated Nov. 6, 2018.
(Continued)

Primary Examiner — Nathan T Leong
(74) Attorney, Agent, or Firm — Manabu Kanesaka

(57) ABSTRACT

A coating agent is capable of forming a coating film that has enhanced adhesion and adherence to a substrate, and enhanced water resistance as well and composed mainly of an aqueous material. A process of forming a coating agent uses the coating agent, a primer treatment process uses the coating agent, a process of doing repairs to concretes uses the coating agent, and a process of laying down roads uses the coating agent. The coating agent is composed mainly of a polyphenol derivative and containing a polymerizing agent, and has a pH of 9 or less. The polymerizing agent contains a compound having two or more functional groups selected from the group of an amino group and a mercapto group per molecule. In the process of forming a coating film, the coating agent is applied onto a substrate in an alkaline environment having a pH of greater than 9.

4 Claims, 7 Drawing Sheets

(51) Int. Cl.
*C09D 5/00* (2006.01)
*C08K 5/00* (2006.01)
*C08K 5/138* (2006.01)
*C08K 5/17* (2006.01)
*C08K 5/42* (2006.01)

(52) U.S. Cl.
CPC .............. *C08K 5/138* (2013.01); *C08K 5/17* (2013.01); *C08K 5/42* (2013.01)

(56) References Cited

U.S. PATENT DOCUMENTS

| | | | |
|---|---|---|---|
| 9,863,044 B2 | 1/2018 | Rzeznik et al. | |
| 2003/0211313 A1* | 11/2003 | Tasaki | C08L 95/00 106/284 |
| 2013/0139727 A1* | 6/2013 | Constantz | C04B 11/00 106/656 |
| 2018/0200680 A1 | 7/2018 | Sivaniah et al. | |

FOREIGN PATENT DOCUMENTS

| | | |
|---|---|---|
| JP | H10-182796 A | 7/1998 |
| JP | 2014-70278 A | 4/2014 |
| JP | 2017-018910 A | 1/2017 |

OTHER PUBLICATIONS

Hae-Shin Lee et al. "Mussel-Inspired Surface Chemistry for Multi Functional Coating"; Science, 2007, vol. 318, pp. 426 to 430, ISSN 1095-9203.

Junjie Wu et al., "Low-cost Mussel Inspired Poly Coating with Superior Anticorrosion Capability on Copper", Journal of Colloid andInterface Science, 2016, vol. 463, pp. 214-221, ISSN 0021-9797, pp. 215-216.

Europe Patent Office, "Search Report for European Patent Publication No. 18847453.0," dated Jan. 15, 2021.

* cited by examiner

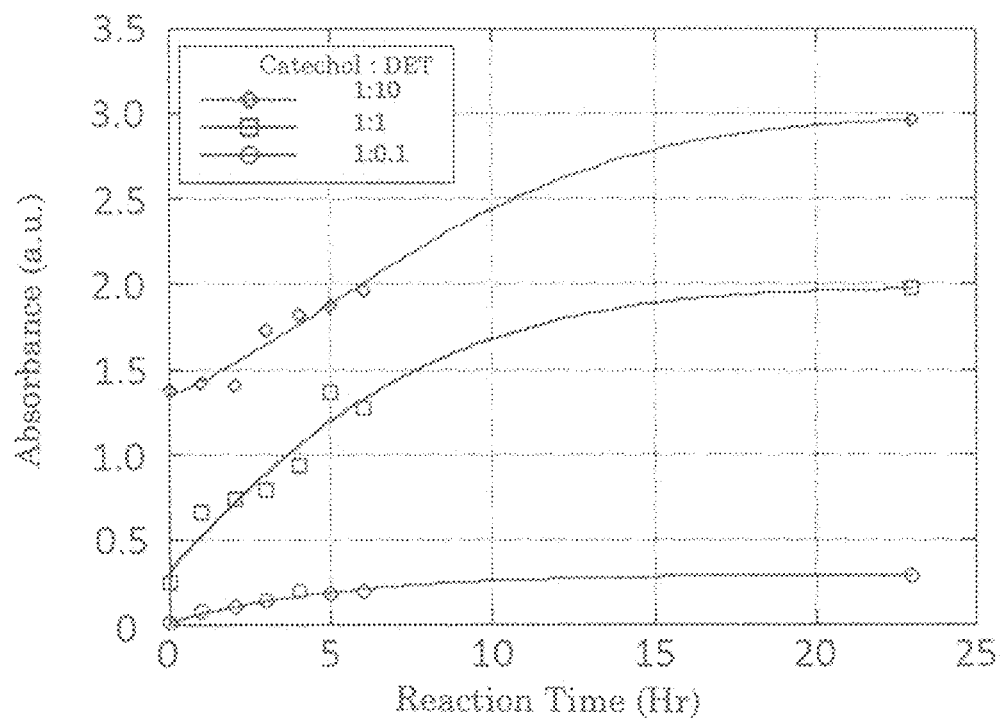
FIG.4
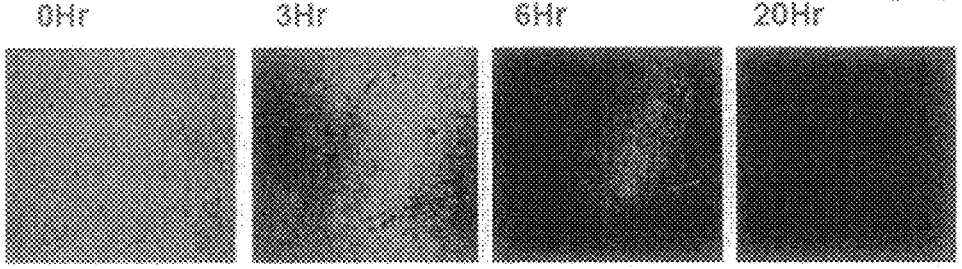
FIG.5(a) 0Hr   FIG.5(b) 3Hr   FIG.5(c) 6Hr   FIG.5(d) 20Hr
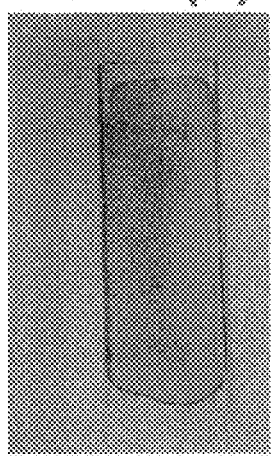
FIG.6(a) After Coating
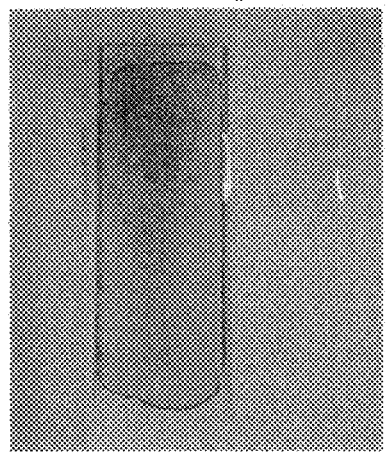
FIG.6(b) Application of Tape
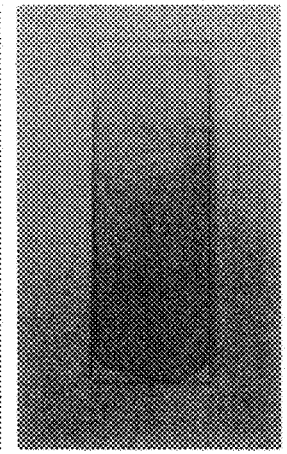
FIG.6(c) After 6 Tape Peelings

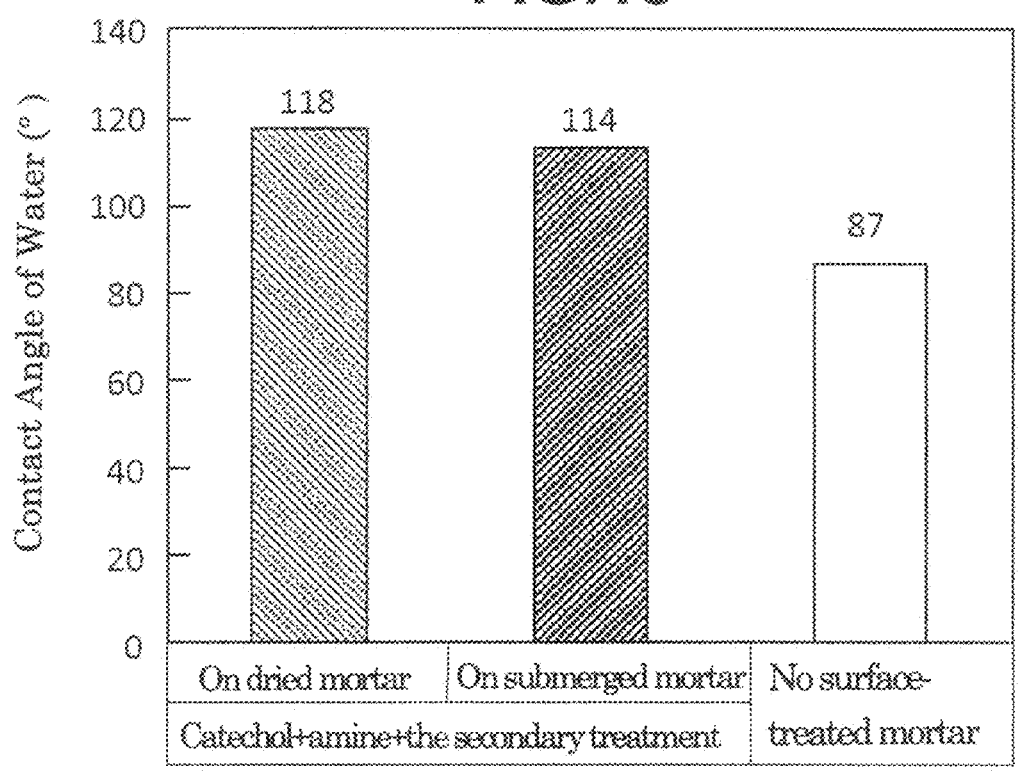

US 11,549,033 B2

COATING AGENT, PROCESS OF FORMING COATING FILMS, PRIMER TREATMENT PROCESS, PROCESS OF REPAIRING CONCRETES, AND PROCESS OF CONSTRUCTING ROADS

RELATED APPLICATIONS

The present application is National Phase of International Application No. PCT/JP2018/030880 filed Aug. 21, 2018, and claims priority from Japanese Application No. 2017-159233, filed Aug. 22, 2017, the disclosure of which is hereby incorporated by reference herein in its entirety.

FIELD OF THE INVENTION

The present invention relates to a coating agent, a process of forming a coating film, a primer treatment process, a process of repairing or fixing concretes, and a process of constructing or laying down roads.

BACKGROUND ART

Coating films in the form of prime-coating films or repair films such as surface protecting films, primers and sealers are used in various situations where they are required to have such performances as mentioned below.

A coating film in the form of a surface protecting film is required to have water resistance, chemical resistance or the like, and have enhanced adhesion to a substrate to which the coating film is applied.

A coating film in the form of a prime-coating film such as a primer or a sealer is required to have enhanced adhesion to a substrate to which the coating film is applied as well as a film to be formed on a prime-coating film. Upon formation of a film on a coating film such as a prime-coating film, it is required to prevent its components from soaking into the substrate. Further, the coating film in the form of a prime-coating film is often required to have high resistance and impermeability to liquid such as rainwater or seawater in general and water in particular passing through a film formed thereon, say, high water resistance and waterproofness.

A coating film in the form of a repair film is required to have high adhesion and adherence to a substrate to be repaired such that cracks occurring in the substrate are not enlarged or spread. The coating film is also required to have water resistance, waterproofness and hydrophobicity (water repellency) high enough to keep water or the like from entering from the repair.

As mentioned above, these coating films are commonly required to have high adhesion and adherence to substrates as well as high water resistance.

Further, the coating films are preferably aqueous, because the aqueous coating films are less harmful to the human body and the environment than a solvent-based coating film.

Dopamine is known for an aqueous coating material capable of forming a coating film on various substances (see Non-patent Publication 1).

PRIOR ARTS

Non-Patent Publication 1: Science, Vol. 318, p. 426 (2007)

SUMMARY OF THE INVENTION

Problems with the Prior Art

However, any prior art says nothing about the formation of a coating film having enhanced adhesion and adherence to a substrate as well as enhanced water resistance using an aqueous coating material inclusive of the aforesaid dopamine.

With the foregoing in mind, the present invention has for its objects to provide a coating agent that is capable of forming a coating film having enhanced adhesion and adherence to a substrate as well as enhanced water resistance and contains an aqueous material as a main component, and a process of forming a coating film, a primer treatment process, a process of repairing concretes and a process of constructing or laying down roads using the coating agent, respectively.

EMBODIMENTS OF THE INVENTION

Specific embodiments of the invention are set out below.

Embodiment 1

A coating agent comprising a main component containing a polyphenol derivative and a polymerizing agent, wherein:
the coating agent has a pH of no greater than 9, and
the polymerizing agent contains a compound having two or more functional groups selected from the group consisting of an amino group and a mercapto group per molecule.

Embodiment 2

The coating agent according to Embodiment 1, wherein the polyphenol derivative is a compound having two or more hydroxyl groups positioned adjacent to one another and bonded together in at least one aromatic ring.

Embodiment 3

The coating agent according to Embodiment 1 or 2, wherein the polyphenol derivative is at least one compound selected from the group consisting of catechol and a catechol derivative.

Embodiment 4

The coating agent according to Embodiment 3, wherein the catechol derivative is at least one compound selected from the group consisting of dopamine, dihydroxybenzoic acid and dihydroxyphenylalanine.

Embodiment 5

The coating agent according to Embodiment 1 or 2, wherein the polyphenol derivative is at least one compound selected from the group consisting of gallic acid and tannic acid.

Embodiment 6

The coating agent according to any one of Embodiments 1 to 5, wherein the amino group is based on a primary or secondary amines.

Embodiment 7

The coating agent according to any one of Embodiments 1 to 6, wherein the amino group is based on at least one compound selected from the group consisting of an aliphatic polyamine, an aryl aliphatic polyamine, an alicyclic polyamine, an aromatic polyamine, a heterocyclic polyamine and a polyalkoxy polyamine in which the alkoxy group is oxyethylene, oxypropylene, oxy-1,2-butylene and oxy-1,4-butylene or a copolymer thereof.

Embodiment 8

The coating agent according to any one of Embodiments 1 to 7, wherein the compound having two or more functional groups selected from the group consisting of an amino group and a mercapto group per molecule is at least one compound selected from the group consisting of diethylenetriamine, triethylenetetramine, tetraethylenepentamine, pentaethylenehexamine, hexamethylenediamine, N-(2-aminoethyl)-1,3-propanediamine, N,N'-1,2-ethanediylbis-1,3-propanediamine, dipropylene-triamine, m-xylylenediamine, p-xylylenediamine, 1,3-bisaminocyclohexylamine, isophoronediamine, 4,4'-methylenebiscyclohexaneamine, 4,4'-methylenebis-(2-methyl-cyclohexaneamine), m-phenylenediamine, diaminodiphenylmethane, diaminodiphenylsulfone, N-aminoethylpiperazine, 3,9-bis(3-aminopropyl)-2,4,8,10-tetraoxaspiro(5,5)undecane, 4,7-dioxadecane-1,10-diamine, 1-propanamine, 3,3'-(oxybis(2,1-ethanediyloxy))bis (diaminopropylated diethylene glycol), poly(oxy(methyl-1,2-ethanediyl)α-(2-aminomethylethyl)ω-(2-aminomethylethoxy), triethylene glycol diamine, poly(oxy(methyl-1,2-ethanediyl))α,α'-(oxydi-2,1-ethanediyl)bis(ω-aminomethylethoxy)), bis(3-aminopropyl) polytetrahydrofuran, bis(3-aminopropyl) polytetrahydrofuran 750, poly(oxy(methyl-1,2-ethanediyl))α-hydro-ω-(2-aminomethylethoxy) ether, diaminopropyldipropylene glycol having 2-ethyl-2-(hydroxymethyl)-1,3-propanediol, 1,2-ethanedithiol, 1,3-propanedithiol, 1,4-butanedithiol, 1,6-hexanedithiol, 2,2'-thiodiethanethiol, 3,6-dioxa-1,8-octanedithiol, 1,2-benzenedithiol, 1,4-benzenedithiol, toluene-3,4-dithiol, 3-mercaptobutylate and 2-aminoethanedithiol.

Embodiment 9

The coating agent according to any one of Embodiments 1 to 8, wherein the molar ratio of the compound having two or more functional groups selected from the group consisting of an amino group and a mercapto group with respect to the polyphenol derivative is no less than 0.1 to no greater than 10.

Embodiment 10

The coating agent according to any one of Embodiments 3, 4, 6, 7 and 8, wherein the molar ratio of the compound having two or more functional groups selected from the group consisting of an amino group and a mercapto group with respect to the catechol or catechol derivative is no less than 0.1 to no greater than 10.

Embodiment 11

The coating agent according to any one of Embodiments 1 to 10, which has a pH of no greater than 7.

Embodiment 12

The coating agent according to any one of Embodiments 1 to 11, which contains a pH regulator.

Embodiment 13

The coating agent according to Embodiment 12, wherein the pH regulator is a buffer solution.

Embodiment 14

The coating agent according to Embodiment 13, wherein the buffer solution contains at least one of a tris(hydroxymethyl) aminomethane solution, a phosphate buffer or an acetic acid buffer.

Embodiment 15

A process of forming a coating film, wherein the coating agent according to any one of Embodiments 1 to 14 is applied onto a substrate in an alkaline environment having a pH of greater than 9 to form a coating film thereon.

Embodiment 16

A process of forming a coating film, wherein the coating agent according to any one of Embodiments 1 to 14 is brought into contact with an alkaline substrate having a pH of greater than 9 to form a coating film on at least a portion of a surface layer of the substrate.

Embodiment 17

The process according to Embodiment 16, wherein the alkaline substrate is a concrete or mortar.

Embodiment 18

A process of forming a coating film, comprising a step of alkalifying a substrate to place the surface of the substrate in a state having a pH of greater than 9, and a step of bringing the coating agent according to any one of Embodiments 1 to 14 into contact with the surface of the substrate to form a coating film.

Embodiment 19

A process of forming a coating film, comprising a step of applying the coating agent according to any one of Embodiments 1 to 14 onto a substrate, and a step of treating the coating agent applied onto the substrate with an alkaline liquid to form a coating film.

Embodiment 20

The process of forming a coating film according to any one of Embodiments 16 to 19, wherein the substrate is wetted with water.

Embodiment 21

The process of forming a coating film according to any one of Embodiments 15 to 20, which further comprises a step of, after formation of the coating film, bringing a solution containing at least one of an alkylamine, thiol fluoride or fluorine carbide into contact with the coating film.

Embodiment 22

A primer treatment process, comprising a step of forming a coating film by applying the coating agent according to any one of Embodiments 1 to 14 onto an alkaline substrate, or alkalifying a substrate and then applying the coating agent according to any one of Embodiments 1 to 14 onto the substrate, or applying the coating agent according to any one of Embodiments 1 to 14 onto a substrate and then alkalifying the coating agent using an alkaline liquid, and a step of bringing a solution containing any one of an alkylamine, thiol fluoride or fluorine carbide into contact with the coating film to make a surface of the coating film hydrophobic.

Embodiment 23

A process of repairing a concrete by filling the coating agent according to any one of Embodiments 1 to 14 in a crack portion in the concrete to form a polymerized film in the crack portion.

Embodiment 24

A process of laying down a road by successively carrying out a step of forming a water-repellent layer on a substrate and a step of forming an asphalt on the water-repellent layer, wherein the water-repellent layer in the step of forming a water-repellent layer contains at least one of a polyurethane resin, an acrylic resin, an epoxy resin, a synthetic rubber, and a polyester-based unwoven fabric, and a step of applying the coating agent according to any one of Embodiments 1 to 14 onto the substrate in an alkaline environment is provided prior to the step of forming a water-repellent layer.

Embodiment 25

The process of laying down a road according to Embodiment 24, wherein after the step of applying the coating agent onto the substrate and before the step of forming a water-repellent layer, a step of applying a solution containing at least one of an alkylamine, thiol fluoride or fluorine carbide is provided.

ADVANTAGES OF THE INVENTION

According to the present invention, it is possible to provide a coating agent that is capable of forming a coating film having enhanced adhesion and adherence to a substrate as well as enhanced water resistance and contains an aqueous material as a main component, and a process of forming a coating film, a primer treatment process, a process of repairing concretes and a process of laying down roads using the coating agent, respectively.

BRIEF EXPLANATION OF THE DRAWINGS

FIG. 4 is a diagram indicative of the reaction time dependency, per composition ratio, of absorbance of the coating agent according to the invention.
FIGS. 5(a) to 5(d) are planar photographs indicative of changes with time of homogeneity of a coating film formed from the coating agent according to the invention.
FIGS. 6(a) to 6(c) are planar photographs indicative of the results of adhesive force estimation of a coating film by way of adhesive tape peel testing.
FIG. 13 is a diagram indicating that the coating agent of the invention is capable of forming a coating film even in an environment submerged under water.

MODES FOR CARRYING OUT THE INVENTION

Mode 1 of the Invention

Figure 1:
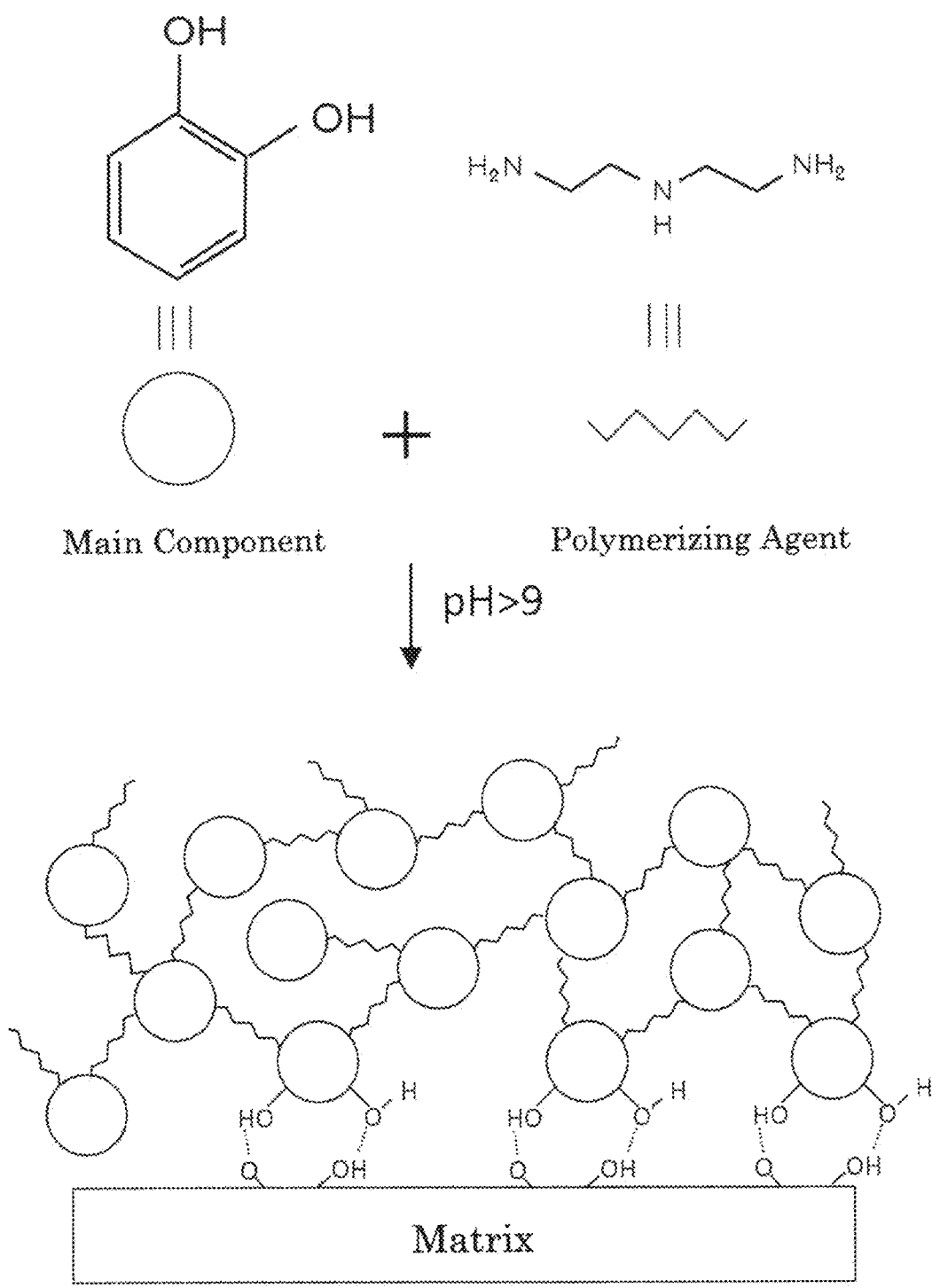
FIG. 1 is illustrative of the principles of formation of a coating film and adhesion (close contact) of that film to a substrate according to the invention.

With reference to Mode 1 of the invention, the coating agent of the invention will be explained.

The coating agent of the invention contains a polyphenol derivative-containing main component and a polymerizing agent and has a pH of no greater than 9, and the polymerizing agent contains a compound having two or more functional groups selected from the group consisting of an amino group and a mercapto group per molecule.

As shown in the following formulae (A1) to (A7), the polyphenol derivative is preferably a compound having two or more hydroxyl groups positioned adjacent to one another and bonded together in at least one aromatic ring. It is here noted that the polyphenol itself may also be taken as one of the polyphenol derivatives.

The polyphenol derivative is preferably a compound having two or more hydroxyl groups positioned adjacent to one another and bonded together, and more preferably at least one compound selected from the group consisting of catechol and a catechol derivative or at least one compound selected from the group consisting of gallic acid and tannic acid.

For the polyphenol derivative, there may be the mention of, in addition to the aforesaid catechol, gallic acid and tannic acid, dopamine, dihydroxybenzoic acid, dihydroxyphenylalanine or the like, among which catechol is more preferable in terms of lower material cost. Note here that catechol is represented by the following formula (A3), gallic acid by formula (A4), dihydroxybenzoic acid (2,3-DHBA) by formula (A5), dihydroxyphenylalanine (3,4-dihydroxy-L-phenylalanine) by (A6), and tannic acid by (A7).

Chemical Formula 1

(A1)
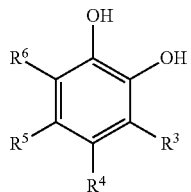

Chemical Formula 2

(A2)
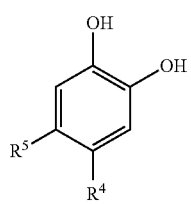

Chemical Formula 3

(A3)
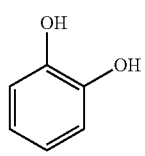

Chemical Formula 4

(A4)
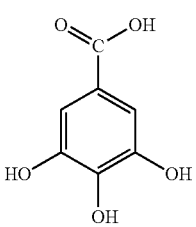

Chemical Formula 5

(A5)
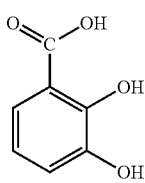

Chemical Formula 6

(A6)
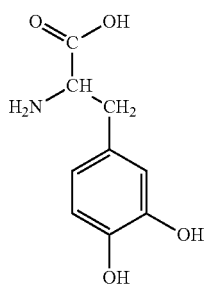

Chemical Formula 7

(A7)
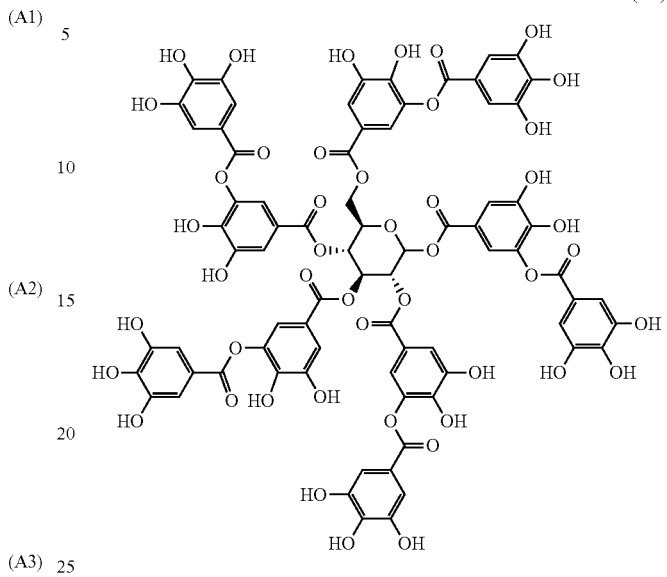

It is here understood that tannins are a comprehensive term for plant components that yield polyvalent phenols by way of hydrolysis, and generally broken down into hydrolysable tannin in which gallic acid or ellagic acid is ester bonded to glucose or the like and which is susceptible of hydrolysis with acids or enzymes, and condensed tannin in which a compound having a flavanol skeleton is polymerized. Even with any one of tannins or their mixtures, the advantages of the invention would be achievable. The hydrolysable tannin is preferred; for instance, tannin containing as a main component a tannic acid and represented by formula (A7) may be mentioned. Note here that tannic acid has additional activities such as bactericidal and antibacterial activities.

The main component may be composed of these polyphenol derivatives alone, or contain them in its main and/or side chains in combination. Note here that composing the main component of the polyphenol derivative alone is favorable in terms of cost.

The polymerizing agent contains two or more functional groups selected from the group consisting of an amino group and a mercapto group per molecule.

The amino group is preferably based on primary or secondary amines. More preferably, the amino group is based on at least one compound selected from the group consisting of an aliphatic polyamine, an aryl aliphatic polyamine, an alicyclic polyamine, an aromatic polyamine, a heterocyclic polyamine, and a polyalkoxy polyamine in which the alkoxy group is oxyethylene, oxypropylene, oxy-1,2-butylene and oxy-1,4-butylene or a copolymer thereof.

Specific compounds preferably used as the polymerizing agent include at least one compound selected from the group consisting of diethylenetriamine, triethylenetetramine, tetraethylenepentamine, pentaethylenehexamine, hexamethylenediamine, N-(2-aminoethyl)-1,3-propanediamine, N,N'-1, 2-ethanediylbis-1,3-propanediamine, dipropylene-triamine, m-xylylenediamine, p-xylylenediamine, 1,3-bisaminocyclohexylamine, isophoronediamine, 4,4'-methylenebiscyclohexaneamine, 4,4'-methylenebis-(2-methyl-cyclohexaneamine), m-phenylenediamine, diamino-diphenylmethane, diaminodiphenylsulfone, N-amino-ethylpiperazine, 3,9-bis (3-aminopropyl)-2,4,8,10-tetraoxaspiro(5,5)undecane, 4,7-dioxadecane-1,10-diamine, 1-propanamine, 3,3'-(oxybis(2,1-ethanediyloxy))bis (diaminopropylated diethylene glycol), poly(oxy(methyl-1,2-ethanediyl)α-(2-aminomethylethyl)ω-(2-aminomethylethoxy), triethylene glycol diamine, poly(oxy(methyl-1,2-ethanediyl))α,α'-(oxydi-2,1-ethanediyl)bis(ω-aminomethylethoxy)), bis(3-aminopropyl) polytetrahydrofuran, bis(3-aminopropyl) polytetrahydrofuran, bis(3-aminopropyl) polytetrahydrofuran 750, poly(oxy(methyl-1,2-ethanediyl))α-hydro-ω-(2-aminomethylethoxy) ether, diaminopropyldipropylene glycol having 2-ethyl-2-(hydroxymethyl)-1,3-propanediol, 1,2-ethanedithiol, 1,3-propanedithiol, 1,4-butanedithiol, 1,6-hexanedithiol, 2,2'-thiodiethanethiol, 3,6-dioxa-1,8-octanedithiol, 1,2-benzenedithiol, 1,4-benzenedithiol, toluene-3,4-dithiol, 3-mercaptobutylate and 2-aminoethanedithiol.

Set out below are the chemical formulae for the compounds preferably used as the polymerizing agent. Note here that formula (A8) stands for diethylenetriamine (DET), formula (A9) stands for hexamethylenediamine (HMD), formula (A10) stands for tris-2-aminoethylamine (TAEA), formula (A11) stands for polyethyleneimine (PEI), formula (A12) stands for polyethylene glycol bis(3-amino-propyl) ether (PEG), formula (A14) stands for 1,2-ethanedithiol, formula (A15) stands for 1,3-propanedithiol, formula (A16) stands for 1,4-butanedithiol, formula (A17) stands for 1,6-hexanedithiol, formula (A18) stands for 2,2'-thiodiethanethiol, formula (A19) stands for 3,6'-dioxa-1,8-octanedithiol, formula (A20) stands for 1,2-benzenedithiol, formula (A21) stands for toluene-3,4-dithiol, formula (A22) stands for 1,4-benzenedithiol, formula (A23) stands for 3-mercaptobutylate, and formula (A24) stands for 2-aminoethanethiol.

Chemical Formula 8

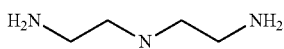
(A8)

Chemical Formula 9

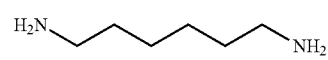
(A9)

Chemical Formula 10

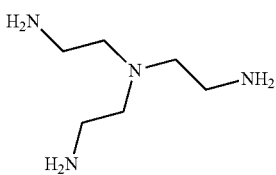
(A10)

Chemical Formula 11

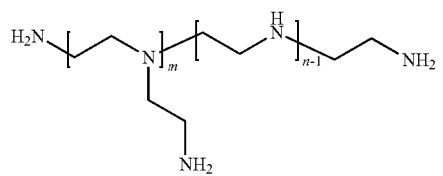
(A11)

Chemica Formula 12

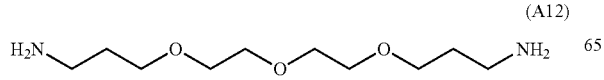
(A12)

Chemical Formula 13

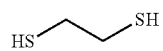
(A14)

Chemical Formula 14

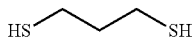
(A15)

Chemical Formula 15

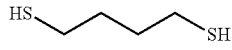
(A16)

Chemical Formula 16

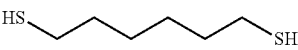
(A17)

Chemical Formula 17

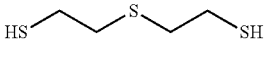
(A18)

Chemical Formula 18

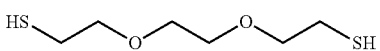
(A19)

Chemical Formula 19

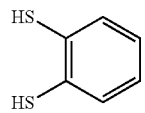
(A20)

Chemical Formula 20

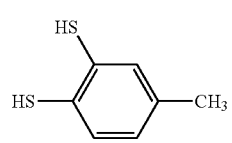
(A21)

Chemical Formula 21

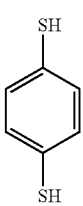
(A22)

Chemical Formula 22

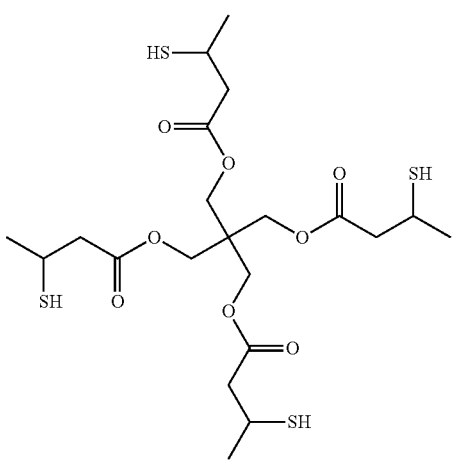

(A23)

Chemical Formula 23

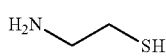

(A24)

In the coating agent of the invention, the molar ratio of the compound having two or more functional groups selected from the group consisting of an amino group and a mercapto group per molecule with respect to the polyphenol derivative is preferably no less than 0.1 to no greater than 10, more preferably no less than 0.5 to no greater than 2, and most preferably 1. At a molar ratio of no less than 0.1, film polymerization proceeds sufficiently, resulting in the formation of a robust coating film. At a molar ratio of no greater than 10, the adhesion of the coating film to a substrate becomes sufficient, resulting in an improvement in the homogeneity of the coating film. The molar ratio is more preferably defined by the molar ratio of the compound having two or more functional groups selected from the group consisting of an amino group and a mercapto group per molecule forming the polymerizing agent with respect to the total amount of catechol and a catechol derivative in the main component.

The coating agent of the invention has a pH of preferably no greater than 9, and more preferably no greater than 7. At a pH of greater than 9, polymerization reactions are likely to take place in the coating agent, giving rise to a problem in terms of storage stability.

From a viewpoint of storage stability, the pH is preferably kept as low as possible, but the pH of no greater than 7 ensures sufficient storage stability. It is here noted that as the pH of the coating agent has a value of as low as 1, it is not preferable because there is the need for making a coating film-formation environment such highly alkaline as represented by pH 13 for instance, and the time for forming a coating film becomes long.

For the purpose of keeping the pH of the coating agent no greater than 9, preferably no greater than 7, it is preferable for the coating agent to contain a pH regulator. A buffer solution is preferably used as the pH regulator because the given pH is stably obtained so that storage stability can be enhanced. As the pH of the coating agent remains stable, it also ensures that the time taken for the formation of a coating film remains stabilized. In this sense, it is preferable to use the buffer. For instance, the buffer solution preferable for the pH regulator includes a tris(hydroxymethyl)aminomethane solution, a phosphate buffer, and an acetic acid buffer.

The coating film obtained using this coating agent will then be explained with reference to FIG. 1.

The polyphenol derivative that is the main component reacts with the polymerizing agent having two or more functional groups selected from the group consisting of an amino group and a mercapto group per molecule by way of the Schiff base reaction or the Michelson addition reaction in an alkaline environment to form a coating film in which they are polymerized. From a detailed study, it has been found that this polymerization reaction takes place noticeably in an alkaline environment having a pH of greater than 9, but it hardly does in an alkaline environment having a pH of no greater than 9. Therefore, a coating film is formed in an alkaline environment having a pH of greater than 9. It is here noted that no particular heat treatment is needed for this reaction.

Referring to the polyphenol derivative forming part of the main component, two or more hydroxyl groups are present in at least one aromatic ring. These hydroxyl groups interact with oxygen groups (O) or hydroxyl groups (OH) on the substrate to be coated with a coating film so that the coating film comes in adhesion to the substrate. Most substrates have oxygen groups (O) or hydroxyl groups (OH) on their surfaces; this coating film may be formed on various substrates with enhanced adhesion to them.

With the hydroxyl groups on the aromatic ring adjacent to one another, this adhesive force grows much stronger. For this reason, catechol or its derivative having two hydroxyl groups on the aromatic ring and adjacent to each other is preferable from a viewpoint of adhesion of the coating film to the substrate.

Mode 2 of the Invention

How to form a coating film will be explained with reference to Mode 2 of the invention.

The process of forming a coating film according to the invention is characterized in that the coating agent is coated in an alkaline environment having a pH of greater than 9. As the coating agent is placed in an alkaline environment having a pH of greater than 9 as shown in FIG. 1, it causes a film to be formed by polymerization via the Schiff base reaction or the Michelson addition reaction. The rate or speed of formation of this coating film is dependent on alkalinity; from a viewpoint of film formation rate, viz., instantaneous film formation, the higher the alkalinity or the larger the pH value of the environment, the more preferable.

The coating film of the invention contains a polyphenol derivative. The polyphenol derivative includes two or more hydroxyl groups in one aromatic ring, which interact with oxygen groups (O) or hydroxyl groups (OH) on the substrate, causing the coating film to come in adhesion to the substrate. Most substrates have oxygen groups (O) or hydroxyl groups (OH) on their surfaces; this coating film may be formed on various substrates with enhanced adhesion to them.

More specifically, the process of the invention comprises a first process wherein an alkaline substrate having a pH of greater than 9 is provided, and the coating agent explained with reference to Mode 1 of the invention is applied onto the substrate, a second process wherein a substrate is first alkalified to place a surface of the matrix in a pH state of greater than 9, and the coating agent explained with reference to Mode 1 of the invention is then brought into contact with the substrate to form a coating film, and a third process in which the coating agent explained with reference to Mode 1 of the invention is first applied onto a substrate, and an alkaline liquid having a pH of greater than 9 is applied onto the substrate from above the applied coating agent.

It is here noted that the alkaline substrate used in the first process includes a concrete, a mortar, cement or the like.

The process of alkalifying the substrate in the second process makes use of injection or application (coating) of an aqueous solution of potassium hydroxide (KOH), sodium hydroxide (NaOH), calcium hydroxide (Ca(OH)$_2$), sodium carbonate (Na$_2$CO$_3$), tetramethylammonium hydroxide (TMAH), tetraethylammonium hydroxide (TEAH), tetrabutylammonium hydroxide (TBAH) or the like or an alkali solution such as aqueous ammonia (NH$_3$OH) or the like into or onto a substrate.

The alkali liquid in the third process includes an aqueous solution of potassium hydroxide (KOH), sodium hydroxide (NaOH), calcium hydroxide (Ca(OH)$_2$), sodium carbonate (Na$_2$CO$_3$), tetramethylammonium hydroxide (TMAH), tetraethylammonium hydroxide (TEAH), tetrabutylammonium hydroxide (TBAH) or the like, or aqueous ammonia (NH$_3$OH) or the like.

When it is desired to enhance the waterproofness or hydrophobicity (water repellency) of the formed coating film in particular, it is preferable to carry out a secondary treatment of bringing a solution containing at least one of an alkylamine, thiol fluoride or fluorine carbide into contact with the coating film formed by the aforesaid process. This secondary treatment makes sure an improvement in the hydrophobicity (water repellency). The alkylamine referred to herein typically includes dodecylamine (DDA), triethylamine, and n-hexylamine, and the thiol fluoride typically includes perfluorodecanethiol (PFDT) represented by the following formula (A13).

Chemical Formula 24

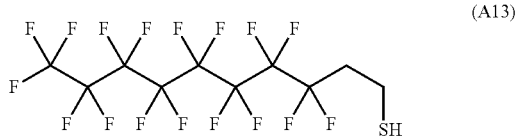

(A13)

The time of treatment by these secondary treatment agents, that is, the time period in which the coating film is in contact with the secondary treatment agent is preferably 60 minutes or longer in order to obtain sufficient waterproofness or hydrophobicity (water repellency). Although there is no upper limit to the secondary treatment time, the upper limit is preferably set at 24 hours or shorter from a viewpoint of shortened treatment time because there is an improvement in the degree of hydrophobicity saturated in a time period of longer than 24 hours. It is here noted that the degree of hydrophobicity may typically be quantified as by the contact angle of water. It is also noted that the secondary treatment may be carried out at normal temperature. As the secondary treatment agent is mixed and used with a hydratable solvent such as tetrahydrofuran, it allows the secondary treatment to be carried out even in a situation where the surface of the coating film is wetted with water.

The coating film formed by the aforesaid process on the substrate provides a film that is enhanced in terms of adhesion and adherence to the substrate, and in terms of water resistance as well.

The formation of the coating film, viz., the polymerization reaction of the coating agent is characterized by taking place by way of the Schiff base reaction or the Michelson addition reaction; it is characterized by being formed by the film-formation reaction proceeding smoothly even in a situation where the substrate is submerged under water or covered up with water.

In addition, the coating film formed by the aforesaid process is characterized in that the instantaneous film-formation capability and waterproofness or hydrophobicity (water repellency) is added thereto by the optimization of film-formation conditions or the secondary treatment.

Mode 3 of the Invention

The primer treatment process is now explained with reference to Mode 3 of the invention.

For the primer, it is desired to have enhanced adhesion and adherence to a variety of films formed thereon as well as water resistance and waterproofness.

As mentioned above, the coating film of the invention has enhanced adhesion and adherence to a variety of substrates as well as water resistance and waterproofness. For this reason, the coating film of the invention is well suited for primers, and the process of forming a coating film according to Mode 2 of the invention is well suited for primer treatment processes.

The secondary treatment explained with reference to Mode 2 is also effective for the secondary treatment for the primer according to this embodiment. In other words, it is preferable to carry out the secondary treatment wherein a solution containing at least one of an alkylamine, thiol fluoride or fluorine carbide is brought into contact with the coating film formed by the process according to Mode 2 (note here that this coating film provides a primer). Accordingly, the primer treatment process preferably includes any one of a step of applying the coating agent according to Mode 1 onto an alkaline substrate to form a coating film, a step of alkalifying a substrate and then applying the coating agent according to Mode 1 of the invention onto the substrate to form a coating film or a step of applying the coating agent according to Mode 1 and using an alkaline liquid for alkalification thereby forming a coating film (primary treatment steps), and a secondary treatment step of bringing a solution containing at least one of an alkylamine, thiol fluoride or fluorine carbide into contact with the coating film for hydrophobic treatment of a surface of the coating film.

This secondary treatment contributes to an improvement in the waterproofness or hydrophobicity (water repellency) of the primer, and further makes the surface of the primer lipophilic, leading to an improvement in the adhesion to paints or asphalts using a variety of organic solvents.

It is here understood that the alkylamine typically includes dodecylamine (DDA), triethylamine and n-hexylamine, and the thiol fluoride typically includes perfluorodecanethiol (PFDT).

The time of treatment by these secondary treatment agents, that is, the time period in which the primer is in contact with the secondary treatment agent is preferably 60 minutes or longer in order to obtain sufficient waterproofness or hydrophobicity (water repellency). Although there is no upper limit to the secondary treatment time, the upper limit is preferably set at 24 hours or shorter from a viewpoint of shortened treatment time because there is an improvement in the degree of hydrophobicity saturated in a time period of longer than 24 hours. It is noted that the secondary treatment may be carried out at normal temperature. As the secondary treatment agent is mixed and used with a hydratable solvent such as tetrahydrofuran, allows the secondary treatment to be carried out even in a situation where the surface of the primer is wetted with water.

Mode 4 of the Invention

In Mode 4 of the invention, the application of the aforesaid coating agent and the process of forming a coating film will be explained with illustrative reference to how to repair concretes and how to lay down roads.

Although repairs to concretes and construction of roads are usually carried out under dry conditions, yet it is still strongly desired to perform repairs or construction work as planned even in a state where substrates are covered up with water as experienced in rainy weather. Where a substrate is covered up with water or submerged under water, however, it is not easy to form a coating film having adhesion and adherence to the substrate.

A problem with repairs to concretes or construction of roads is a time period taken for the repairs or construction and, hence, the coating film should have instantaneous film-formation capability. As the repair or construction time becomes shorter, it permits work to be started earlier than usual, leading to a shorter downtime. For construction of and repairs to roads having much higher importance among social infrastructures, shorter treating time and repair time are of particular importance.

In consideration of such situations, the coating agent and coating film as well as the process of forming a coating film according to the invention are well applied to the process of repairing concretes and the process of laying down roads, because the coating film has enhanced adhesion and adherence even to a substrate covered up with water or submerged under water, and the coating agent is capable of instantaneous film formation and gives waterproofness and hydrophobicity (water repellence) to a substrate.

As the coating agent explained with reference to Mode 1 of the invention is coated onto a concrete or mortar substrate having a high pH, it causes the pH of the coating agent to reach approximately 10 under the influence of a high-pH moisture oozed out from the concrete or mortar substrate so that a coating film adhering well to the substrate is formed. The rate of formation of the coating film is then high, because the pH of the coating agent in contact with the substrate is as high as approximately 10.

The coating agent and coating film as well as the process of forming a coating film according to the invention are also effective for repairs to be done to cracks or rifts in a concrete or mortar substrate. That is, as the coating agent explained with reference to Mode 1 of the invention is filled up in a portion of a concrete or mortar including cracks or rifts, it causes the pH of the coating agent to have a value of approximately 10 under the influence of a high-pH moisture oozed out from the substrate so that the film (repair film) in intimate contact with the concrete or mortar substrate is formed on the concrete or mortar-containing portion to repair the concrete or mortar substrate.

Since this repair film is formed by way of polymerization reactions in an alkaline environment, it may be formed even on a concrete or mortar substrate covered up with water or submerged under water.

Although this repair film is a hydrophobic one, it is understood that when it is desired to place the film in a higher water-resistant, waterproof state more enhanced in terms of hydrophobicity and water repellence, the formed repair film may be coated with a solution containing at least one of an alkylamine, thiol fluoride or fluorine carbide, thereby making it much more hydrophobic and water repellent.

For construction of a road, a water repellent-layer comprising a polyurethane resin, an acrylic resin, an epoxy resin, a synthetic rubber, a polyester-based unwoven fabric, etc. and an asphalt layer are often formed on a concrete substrate or the like in succession. For this construction of a road, it is advantageous to interpose the coating film (primer) according to the invention between the substrate and the water-repellent layer for the purpose of enhancing the adherence of the water-repellent layer to the substrate and preventing water (rainwater, etc.) from coming through cracks or the like in the water-repellent layer.

More specifically, a substrate is first formed of concrete or the like, and the coating agent explained with reference to Mode 1 is then coated on the substrate, followed by formation of the water-repellent layer and asphalt layer. Because the concrete is alkaline as can be seen from a pH of 10 or greater, the coating agent turns into a coating film by way of polymerization reactions. This coating film adheres well to both the substrate and the water-repellent layer, has hydrophobicity (water repellence), and is capable of instantaneous film formation and being formed even in a state where the substrate is covered up with water. It is here noted that when it is desired to place this coating film (primer) in a much more hydrophobic, water-repellent state by making a further improvement in the hydrophobicity and water repellence thereof, the coating film may first be formed, and a solution containing at least one of an alkylamine, thiol fluoride and fluorine carbide may then be applied onto the coating film before the formation of the water-repellent layer.

Although the aforesaid construction of a road is explained with reference to the case where the substrate is formed of concretes, it is understood that when the substrate of a road is not formed of an alkaline material having a pH of greater than 9, for example, the substrate is formed of iron used with a rail-way bridge or the like, the coating agent explained with reference to Mode 1 of the invention may first be coated on the substrate, and then an alkaline solution having a pH of greater than 9 may be coated to form a coating film. The alkaline solution having a pH of greater than 9 typically includes an aqueous solution of potassium hydroxide (KOH), sodium hydroxide (NaOH), calcium hydroxide (Ca(OH)$_2$), sodium carbonate (Na$_2$CO$_3$), tetramethylammonium hydroxide (TMAH), tetraethylammonium hydroxide (TEAH), tetrabutylammonium hydroxide (TBAH) or the like, or aqueous ammonia (NH$_3$OH) or the like.

EXAMPLES

Example 1

Set out in Example 1 are the characteristic features of the coating agent and the process of forming a coating film as well as the coating film.

0.7 mM of catechol and an equimolecular amount of diethylenetriamine (DET) were added to pure water, and a phosphate buffer was further added thereto such that the given pH was obtained to prepare coating agents having a variety of pH values from 5 to 10.5. These operations are performed at room temperature (25° C.). Here note that catechol was obtained from Nacalai Tesque, Inc., and DET was obtained from Wako Pure Chemical Industries, Ltd., and that the phosphate buffer was prepared using Sodium Phosphate 96% (made by ALDRICH), citric acid (Wako Pure Chemical Industries, Ltd.) and boric acid (Wako Pure Chemical Industries, Ltd.).

Then, changes in the absorbance of the coating agent were measured using 366 nm light. The changes in the absorbance of this coating agent stand for changes in the catechol vs. DET interactions, say, changes in the degree of polymerization of catechol and DET. Note here that V670 UV-VIS-NIR Spectrophotometer (made by JASCO Corporation) was used as the measuring apparatus.

Figure 2:
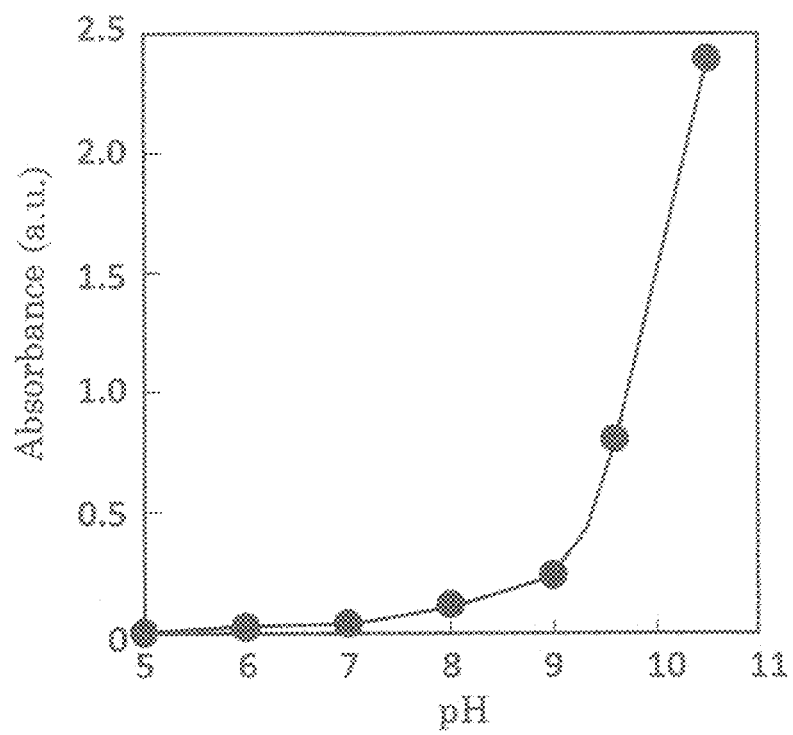
FIG. 2 is a diagram indicative of the pH dependency of absorbance of the coating agent according to the invention.

Shown in FIG. 2 is the absorbance of the coating agent at each pH 23 hours after the preparation. As can be seen from this figure, the absorbance change is small at a pH of 9 or less, but the absorbance goes high drastically at a pH of greater than 9. In other words, the pH of 9 is a critical point for this coating agent; the interaction between catechol and DET is less noticeable at a pH of 9 or less.

Further, a detailed study of an area whose pH is 9 or less shows that the decline of absorbance changes varies at the threshold of pH 7 and the absorbance change is no or little at a pH of 7 or less. In other words, the interaction between catechol and DET is less noticeable at a pH of 9 or less in general, and 7 or less in particular so that the storage stability of the coating agent is kept high.

As the pH is greater than 9, on the other hand, it causes catechol and DET to be abruptly polymerized, and the higher the pH, the larger the absorbance changes, viz., changes in the degree of polymerization are.

Figure 3:
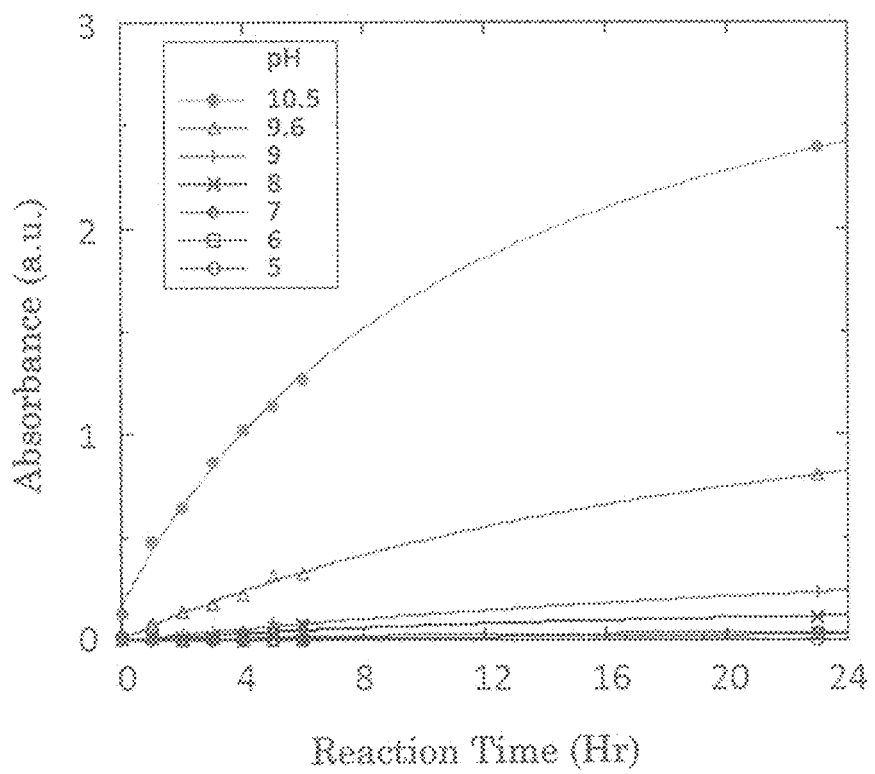
FIG. 3 is a diagram indicative of the reaction time dependency, per pH, of absorbance of the coating agent according to the invention.

FIG. 3 shows an illustrative reaction time vs. absorbance change relation with the pH of the coating agent as a parameter. The absorbance increases nearly linearly relative to the reaction time, and then follows a saturation curve where the increase in absorbance is saturated. In a reaction time area where the absorbance increases nearly linearly, there are >9 hours at pH 9.0, about 8 hours at pH 9.6, and about 4 hours at pH 10.5; the higher the pH, the shorter the reaction time is. As can be seen from comparisons in the nearly linear area, the same absorbance is obtained between the coating agent at a pH of 9.0 after the reaction time of 23 hours and the coating agent at a pH of 9.6 after the reaction time of about 3.5 hours; by raising the pH from 9.0 to 9.6, the polymerization is allowed to proceed at a rate of as fast as about 6.5 times.

These facts mean that if the environment for coating of the coating agent is set in the form of an alkaline environment having a pH of greater than 9.0, the polymerization of the coating agent then proceeds, leading to the formation of a coating film, and that if the pH of this environment grows even higher, the rate of formation of the coating film then grows even higher, making it possible to obtain the coating film instantaneously. Practically, as this coating agent is coated in an environment of pH>9.0, it then leads to the formation of the coating film, and when it is coated in an environment of pH 10, it is identified that a coating film is formed in 5 minutes.

FIG. 4 shows an illustrative relation between the reaction time of this coating agent and the absorbance changes at the time when the molar ratio of DET relative to catechol is changed to 0.1, 1 and 10 (catechol:DET=1:0.1, 1.1 and 10). In either case, the pH of the coating agent was set at 8.5. In all the cases included in this composition rate range, it is understood that the absorbance grows high with the reaction time, indicating that the polymerization proceeds well. Accordingly, the composition rate of this coating agent may be in a range of at least catechol:DET=1:0.1 to 10.

Among others, catechol:DET=1:1 is best suited for the purpose of instantaneous film formation because the absorbance change rises rapidly in response to the reaction time (or there is a large rate of absorbance change in the infancy of the reaction time). It is here noted that although the greater the proportion of DET, the greater the absorbance is at the reaction time of zero, caused by a high absorbance of DET relative to light having a wavelength of 366 nm.

Then, the aforesaid coating agent was coated onto a washed mortar substrate to form a coating film whose characteristic features were estimated.

First of all, in a bath to which ultrasonic waves were applied, a 2 cm long and 2 cm wide mortar sheet was subjected to organic washing using ethanol, hexane and acetone in succession. Each washing time was 5 minutes. Then, the mortar sheet was dried in an 80° C. oven, and the washed concrete was provided as a substrate.

The aforesaid coating agent whose pH was 8.5 (prepared by adding 0.7 mM of catechol and an equimolecular amount of diethylenetriamine (DET) to pure water and adding a phosphate buffer to the resultant solution to form a coating agent having a pH of 8.5) was coated onto the mortar substrate to form a coating film on the mortar substrate. Just after coating, this coating film was found to have a pH of about 10.

FIG. 5 is a set of optical photographs taken of the mortar surface after coating. Although the concentration of the surface varies with time, it is found that 20 hours after coating, there is a coating film obtained which has a uniform concentration, viz., a uniform film thickness.

Then, the adhesion of the coating film was estimated by adhesive tape peeling tests.

A glass substrate was ultrasonically washed with ethanol and fully dried to provide the glass substrate as a substrate under test. Then, 3 mL of a coating agent prepared by dissolving 0.7 mM of catechol and an equimolecular amount of DET in pure water and adding a phosphate buffer to the resultant solution was dropwise coated onto and spread over the glass substrate. Note here that this coating agent had a pH of 8.5.

The glass substrate was provided with a covering spaced away from the coating agent in such a way as to be in no contact with the coating agent. The glass substrate was placed for 18 hours while protected against pollutions from the environment, and the covering was removed off to place it for six hours. At this time, the glass substrate provided with the coating film was fully dried. An adhesive tape peeling test was repeated six times at the same place. Note here that upon sticking of the tape to the coating film, sufficient pressure was applied from above the tape, and upon peeling of the tape, the tape was slowly peeled off. The tape used here is a transparent pressure-sensitive adhesive tape (made by Scapa, Tapes) well fit for JISK5600 adhesion test.

FIG. 6 is illustrative of how the test for estimating the adhesion of the adhesive tape was carried out. FIG. 6 is a set of photographs of the glass substrate as viewed from above, photograph (a) taken after coating (just before the adhesive tape test), (b) taken after sticking of the tape, and (c) taken after six tape peelings.

It has consequently been found that any peeling of the coating film is not observed at all; the coating film is in close contact with the glass substrate with sufficient adhesive force.

Figure 7:
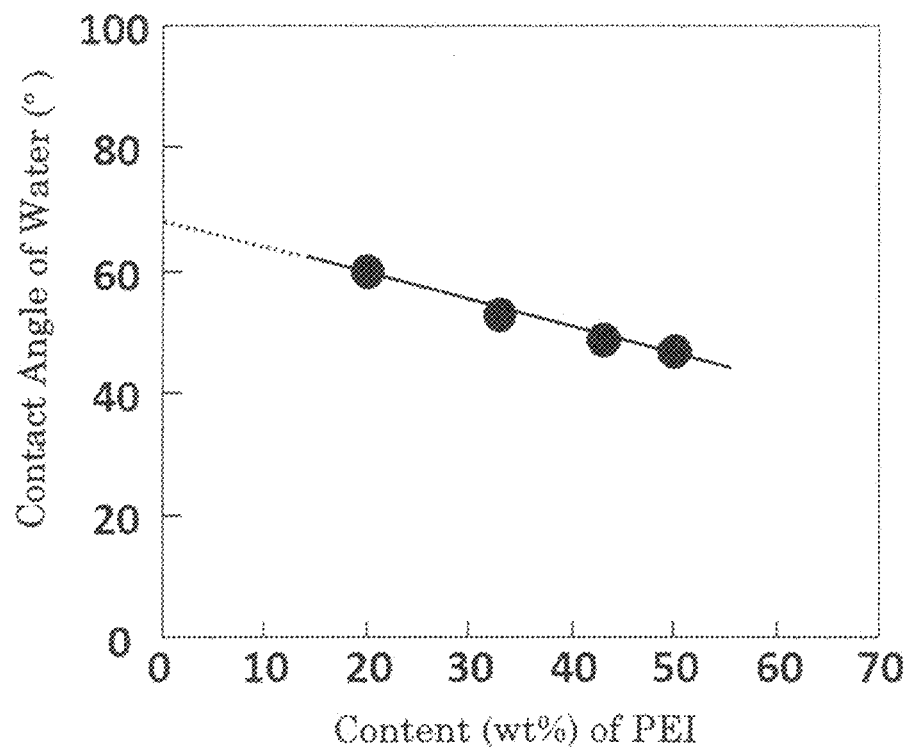
FIG. 7 is a diagram indicative of the characteristics of a coating film formed from the coating agent according to the invention, especially, the dependency of contact angle of water on the amount of polymerizing agent added.

FIG. 7 is illustrative of what influence the addition of the polymerizing agent amine has on the hydrophobicity (water repellence) of the coating agent: FIG. 7 is indicative of the contact angle of water with the coating films obtained by use of the coating agent composed mainly of catechol, and containing polyethyleneimine (PEI) as the polymerizing agent in varied contents. The substrate used in this experiment was a washed concrete, and the coating film just after its formation was found to have a pH of about 10. The contact angle of water was measured at a temperature of 25° C. using Dropmaster 300 (made by Gecco INC.) as measuring apparatus. The amount of dropping water droplets was 20 μL, and the contact angle was measured while a slight amount of rhodamine dye was added to pure water in such a way as to observe the droplets with ease.

The more the PEI content, the linearly smaller the contact angle of water is. The reason would be that increases in the amount of PEI cause too much unpolymerized PEI to be contained in the coating film.

The content of PEI that is the polymerizing agent should be reduced for the purpose of making the contact angle high; in the case of PEI, however, a contact angle of 70° or greater could hardly be obtained even when the content of PEI is reduced down. It is advantageous to carry out the aforesaid secondary treatment so as to obtain even higher contact angles, as exemplified in Example 2 given later.

The durability or endurance of the coating film with respect to chemical liquids was then estimated by the following method.

The coating film was rinsed with three liquids: water, 5% by weight brine (NaCl aqueous solution) and chloroform ($CHCl_3$), respectively, for 15 minutes at most to estimate endurance while the dependency on rinse time of the contact angle of water with the surface of the coating film was used as an index. The coating film was formed by coating a concrete substrate washed as mentioned above with the aforesaid coating agent having a pH of 8.5 (prepared by adding 0.7 mM of catechol and 0.7 mM of DET to pure water and further adding a phosphate buffer to the resultant solution for adjustment to pH 8.5). The contact angle of water was measured at a temperature of 25° C. using Dropmaster 300 (made by Gecco INC.) as measuring apparatus. The amount of dropping water droplets was 20 μL, and the contact angle was measured while a slight amount of rhodamine dye was added to pure water in such a way as to observe the droplets with ease.

Figure 8:
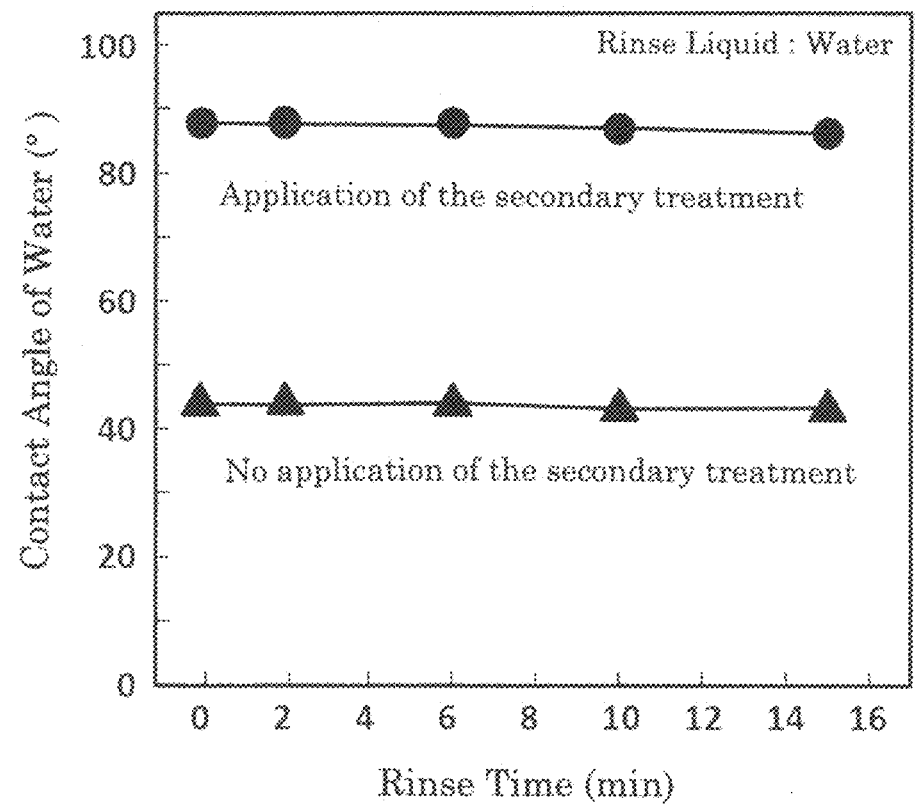
FIG. 8 is a diagram indicative of the water resistance of a coating film according to the invention in terms of the contact angle of water.
Figure 9:
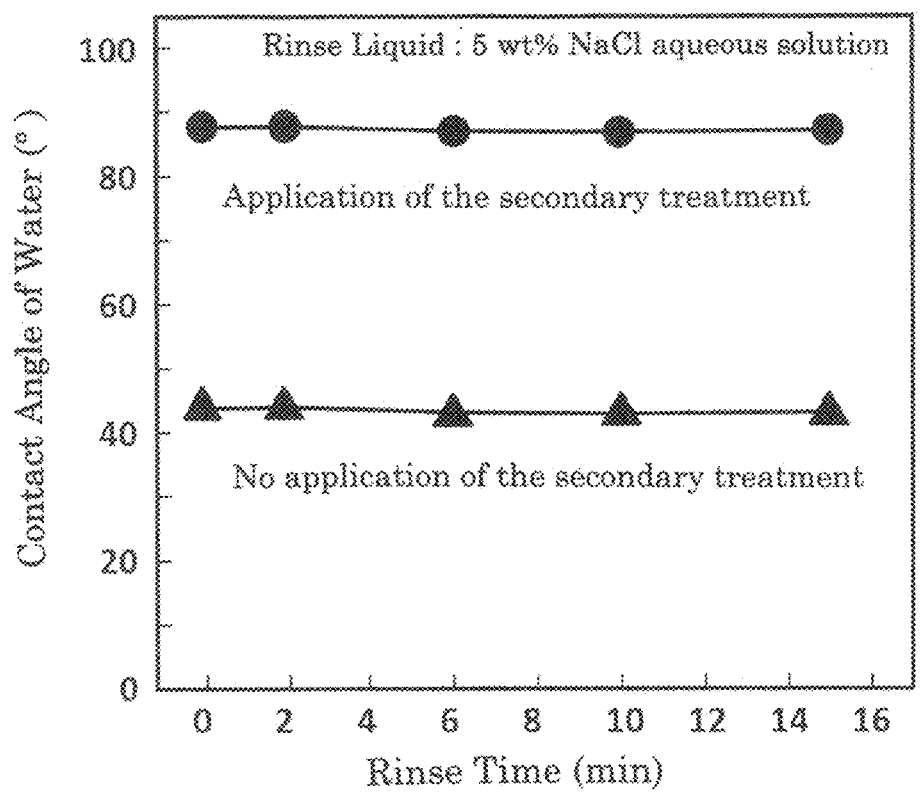
FIG. 9 is a diagram indicative of the saline water resistance of a coating film according to the invention in terms of the contact angle of water.
Figure 10:
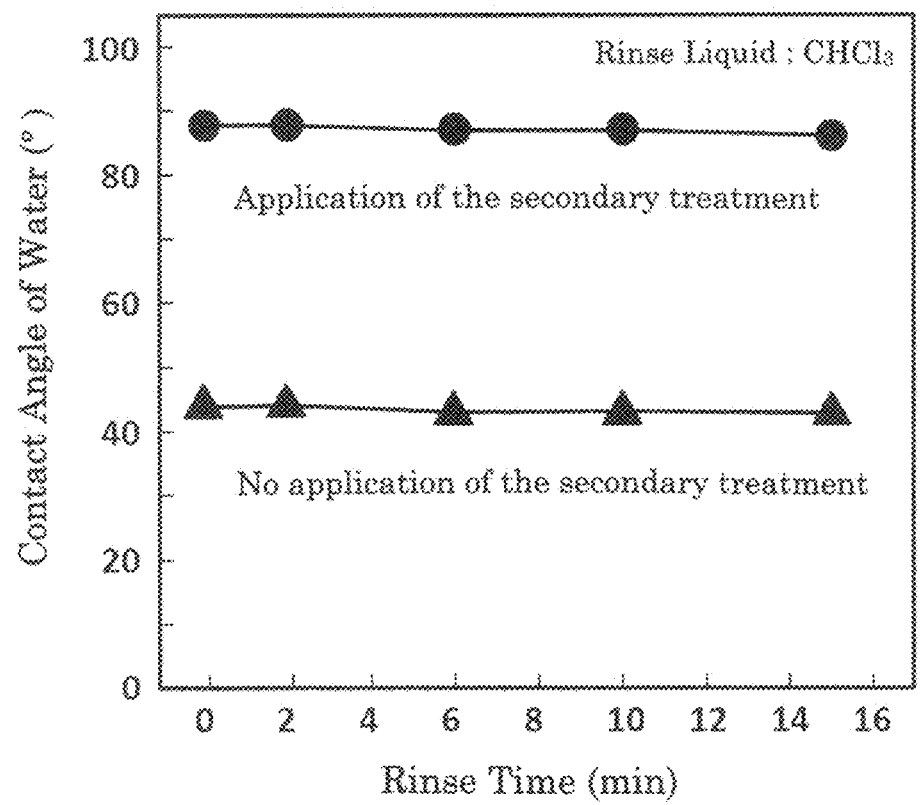
FIG. 10 is a diagram indicative of the organic solvent resistance of a coating film according to the invention in terms of the contact angle of water.

FIGS. 8, 9 and 10 showing the results are also diagrammatically indicative of the dependency on rinse time of the contact angle of water at the time when the coating film formed as mentioned above was rinsed with the three rinse liquids after immersed in the secondary treatment agent (secondary treatment) for 24 hours. Note here that the secondary treatment agent was prepared by adding 2 mg of dodecylamine (DDA) and triethylamine in a molar amount two times as much as DDA per 1 mL of a tetrahydrofuran solvent (THF).

From these diagrams, it has been found that the contact angle of water is no or little dependent on the rinse time of any one of the aforesaid three rinse liquids independently of the presence or absence of the secondary treatment, indicating that the coating film has high resistance to chemical liquids (rinse liquids) or, in other words, the surface of the coating film has a characteristic feature of being invariable in terms of hydrophobicity.

From the foregoing, it has been identified that the coating agent of Example 1 is adjusted in such a way as to have a pH of no greater than 9 in general, and a pH of no greater than 7 in particular, making sure high storage stability, that the applying of the coating agent in an environment having a pH of greater than 9 causes the main component catechol to be polymerized with the polymerizing agent diethylenetriamine to form a coating film, and that the rate of formation of the coating film can be increased by making the pH high. It has also been identified that the formed coating film has sufficient homogeneity or uniformity, high adhesion to a substrate, and high resistance to chemical liquids.

Example 2

In example 2, the secondary treatment of enhancing the hydrophobicity of the coating film and its effect are typically set out.

Figure 11:
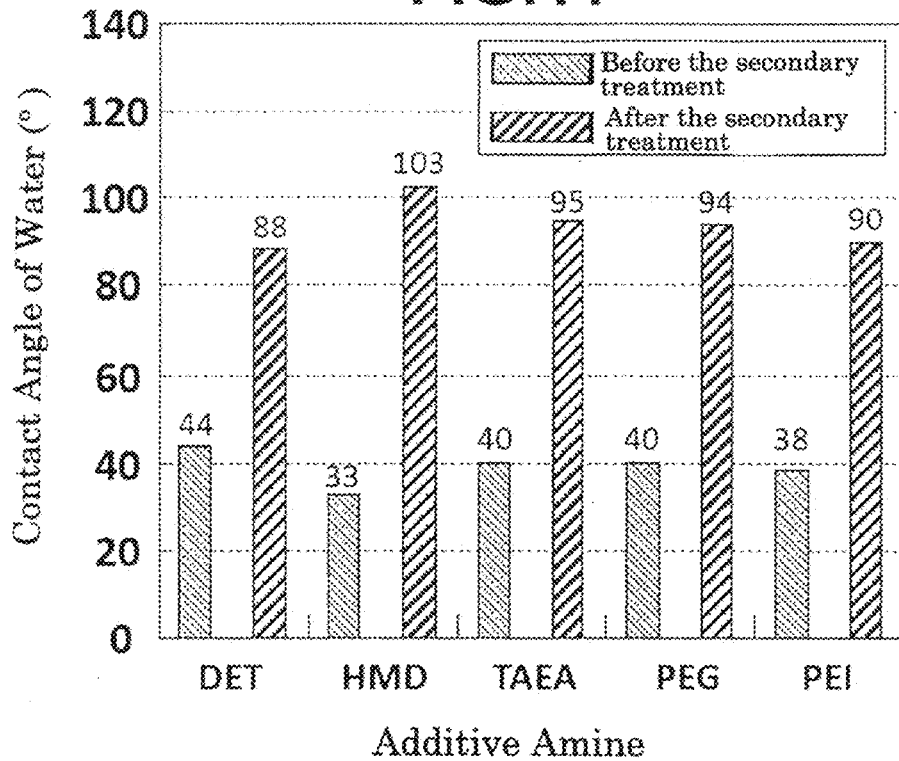
FIG. 11 is a diagram indicative of the characteristics of a coating film formed from the coating agent of the invention, especially, the dependency of the contact angle of water on a polymerizing agent type and the effects of the secondary treatment.

FIG. 11 is a diagram indicative of the contact angles of water in the coating films (those in the primary treatment stage) formed using as the polymerizing agent of the coating agent diethylenetriamine (DET), hexa-methylenediamine (HMD), tris-2-aminoethylamine (TAEA), polyethylene glycol bis(3-amino-propyl) ether (PEG) and polyethyleneimine (PEI), respectively, and the contact angles of water in the films obtained by subjecting those films to the secondary treatment.

It is here noted that catechol was used as the main component of the coating agent and the ratio between the polymerizing agent and the main component was set at an equimolecular ratio. The solvent of the coating agent was pure water. In either case, the pH of the coating material was adjusted to 8.5 by the addition of the phosphate buffer used in Example 1. Washed concrete was used for the substrate. The pH of the coating film just after its formation was about 10.

The secondary treatment agent used herein comprised 2 mg of dodecylamine (DDA) and a molar amount of triethylamine twice as much as DDA per 1 mL of tetrahydrofuran (THF), and a sample was immersed in the secondary treatment agent for 24 hours to carry out the secondary treatment.

Referring to the contact angles in the primary treatment stage prior to the secondary treatment, the smallest angle of 33° was obtained when HMD was used for the polymerizing agent, the largest angle of 44° was obtained when DET was used for the polymerizing agent, and an average value was 39° for the five polymerizing agents. Referring to the contact angles after the secondary treatment, on the other hand, the smallest angle of 88° was obtained when DET was used for the polymerizing agent, the largest angle of 103° was obtained when HMD was used for the polymerizing agent, and an average angle of 94° was obtained for the five polymerizing agents. From these, it has been identified that the contact angle of water nearly doubles, and the coating film subjected to the secondary treatment has high hydrophobicity (water repellence).

Figure 12:
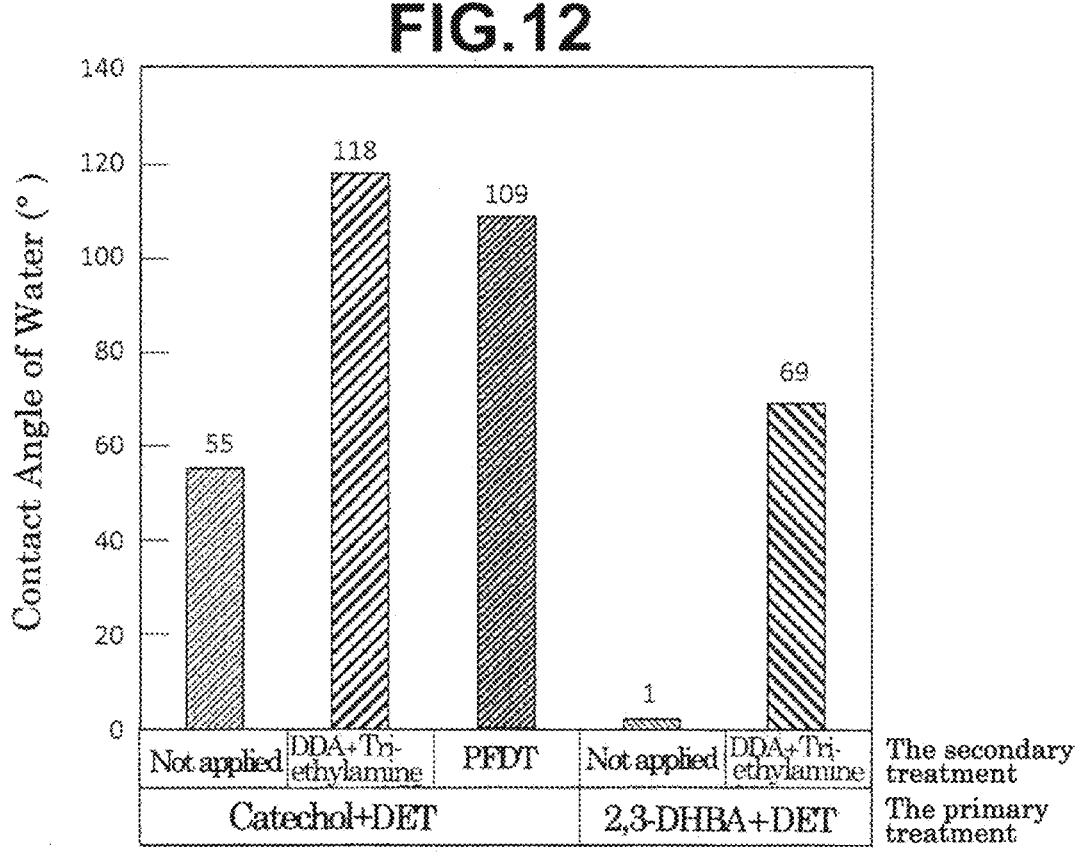
FIG. 12 is a diagram indicative of the characteristics of a coating film formed from the coating agent of the invention, especially, the dependency of the contact angle of water on a main component type and the effects of the secondary treatment.

FIG. 12 shows the results of examination of the effect of the secondary treatment on making the coating film hydrophobic (water repellent) using varying materials for the secondary treatment agent and main component.

An agent (DDA+triethylamine) obtained by adding 2 mg of dodecylamine (DDA) and a molar amount of triethylamine twice as much as DDA per 1 mL of tetrahydrofuran (THF), or PFDT was used as the secondary treatment agent, and catechol or dihydroxybenzoic acid (2,3-DHBA) was used as the main component.

Referring here to the results of measurement using DDA+ triethylamine or PFDT as the secondary treatment agent, it is noted that a coating agent containing catechol and DET in an equimolecular ratio (adjusted to pH 8.5 by the addition of the phosphate buffer used in Example 1) was coated onto a washed concrete substrate, and the resultant coating film sample was immersed in these secondary treatment agents for 24 hours and dried for the measurement of the contact angle of water.

Referring then to the results of measurement using dihydroxybenzoic acid (2,3-DHBA) as the main component, it is understood that a coating agent obtained by dissolving the main component 2,3-DHBA and an equimolecular amount of DET as the polymerizing agent in pure water (adjusted to pH 8.5 by the addition of the phosphate buffer used in Example 1) was coated onto a washed concrete substrate to form a coating film (the contact angle of water measured in this stage was "not subjected to the secondary treatment"), and the coating film was then subjected to the secondary treatment for the measurement of the contact angle of water. Note here that the aforesaid DDA+triethylamine was used as the secondary treatment agent. Then, a sample was immersed in the secondary treatment agent for 24 hours for the secondary treatment, and thereafter dried to measure the contact angle of water.

As a result, it has been found that with such coating agents and secondary treatment agents used in various combinations, the contact angle of water is at least twice as high, meaning that the secondary treatment is effective for making the coating film hydrophobic (water repellent). With the coating agent containing 2,3-DHBA and DET in particular, the contact angle of water is 1° before the secondary treatment whereas it is as high as 69° after the secondary treatment, indicating that the coating film is even much enhanced in terms of hydrophobicity.

Example 3

In Example 3, reference is made to the formation of a coating film on a substrate covered up with water and its effect.

First of all, dried mortar and mortar wetted with water were provided, and a coating film subjected to the primary and secondary treatments was then formed on them to measure the contact angle of water of the coating film, on the basis of which whether or not a coating film having a hydrophobic function can be formed by film formation even in a state covered up with water was examined.

First of all, there were a plurality of similar mortar pieces provided, from which two kinds of mortars were prepared, one being submerged mortars obtained by wetting the mortar pieces with pure water for 5 minutes to wet their surfaces with water, and another being dry mortars placed in a dried state without being subjected to the wetting step using pure water. And the contact angle of water with one of the dried mortars was measured as a reference. It has consequently been found that the untreated, dried mortar (not subjected to any surface treatment) that was the reference has a contact angle of water of 87°, and that the water on the mortar surface has a pH of about 10.

Then, coating agents A and B were provided: coating agent A being obtained by dissolution in pure water of 7 mM of catechol and 7 mM of DET and coating agent B being obtained by dissolution in pure water of 0.7 mM of catechol and 0.7 mM of DET. Each coating agents was adjusted to pH 8.5 by the addition of the phosphate buffer used in Example 1. Then, 50 μL of coating agent A were added dropwise to the surface of the submerged mortar and 500 μL of coating agent B were added dropwise to the surface of the dried mortar to form the associated coating films on the respective mortars.

Apart from this, there was the secondary treatment agent prepared in which 200 mg of dodecylamine and 218 mg of triethylamine were dissolved in 100 mL of tetrahydro-furan (THF).

Then, this secondary treatment agent was divided into two 50 mL portions: the submerged mortar having the coating film formed on it was immersed in one portion overnight, and the dried mortar having the coating film formed on it was immersed in another overnight.

Thereafter, each mortar was removed out of the second treatment agent, and subjected to air-drying for measurement of the contact angle of water with each sample by the aforesaid method.

The measurement results are diagrammatically shown in FIG. 13. The contact angle of water with the coating film formed by way of the secondary treatment on the dried mortar was about 118° on average, and that on the submerged mortar was about 114° on average. More specifically, the contact angle on the dried mortar was 116.0° for the first time of measurement, 115.0° for the second time, 118.5° for the third time, 120.5° for the fourth time and 122.4° for the fifth time, whereas the contact angle on the submerged mortar was 112.4° for the first time of measurement, 112.5° for the second time, 117.9° for the third time, 116.0° for the fourth time and 113.4° for the fifth time.

The contact angle of water with the substrate composed only of dried mortar and used as the reference was 87°, whereas the contact angle value increased significantly when the coating film was formed in combination, and the contact angle value was about 118° on average on the dried mortar and about 114° on average on the submerged mortar, meaning that the contact angle value is approximately invariable even where the substrate (mortar) was submerged under water.

From the aforesaid results, it has been shown that the coating agent of the invention can form a film in a state where a substrate is covered up with water and give thereto a hydrophobic (water-repellent) function on substantially the same level as achieved in a dry state.

INDUSTRIAL APPLICABILITY

Coating agents capable of forming a coating film having enhanced adhesion and adherence to substrates as well as water resistance as well as coating films and primers formed using them find use in various situations, but coating agents that do not only meet this requirement but are also mainly composed of an aqueous material are hardly available.

The present invention provides such coating agents as having wide use in the industry. The coating agent of the invention is also capable of high instantaneous film formation by regulation of film formation conditions thereby achieving high film formation rates. According to a preferable mode of the invention, there can be a coating agent provided, which permits a coating film to be formed even in a state where a substrate is submerged under water or covered up with water, to say nothing of in an atmospheric state. In addition, the coating agent of the invention ensures that waterproofness or hydrophobicity (water-repellence) is given by the secondary treatment to the resulting coating film.

Typically, the present invention may be applied to construction of roads as well as repairs to roads and concrete buildings or structures. That is, the coating agent of the invention, because of being capable of instantaneous film formation, contributes well to shorter completion periods. It is also possible to do repairs to concretes and roads and lay down roads even in a rainy state or the like where the surface of a substrate is covered up with water. In turn, this allows repairs to and construction of roads or the like to go as planned independently from weather, and permits for rapid restoration of roads submerged under water as by torrential rains.

What is claimed is:

1. A process of laying down a road by successively carrying out the steps, comprising:
   a step of preparing a coating agent comprising a main component containing a polyphenol derivative and a polymerizing agent,
   a step of applying the coating agent onto a substrate in an alkaline environment to form a coating film thereon,
   a step of forming a water-repellent layer on the coating film, and
   a step of forming an asphalt on the water-repellent layer, wherein the water-repellent layer in the step of forming the water-repellent layer contains at least one of a polyurethane resin, an acrylic resin, an epoxy resin, a synthetic rubber, and a polyester-based unwoven fabric,
   wherein the coating agent has a pH of no greater than 9, and
   the polymerizing agent contains a compound having two or more functional groups selected from the group consisting of an amino group and a mercapto group per molecule.

2. The process of laying down a road according to claim 1, wherein after the step of applying the coating agent onto the substrate and before the step of forming a water-repellent layer, a step of applying a solution containing at least one of an alkylamine, thiol fluoride or fluorine carbide is provided.

3. A process of forming a coating film, comprising:
   a step of preparing a coating agent comprising a main component containing a polyphenol derivative and a polymerizing agent,
   (i) a step of applying the coating agent onto a substrate in an alkaline environment having a pH of greater than 9 to form a coating film thereon, or
   (ii) a step of contacting the coating agent with an alkaline substrate having a pH of greater than 9 to form a coating film on at least a portion of a surface layer of the substrate, and
   a step of, after formation of the coating film in (i) or (ii), bringing a solution containing at least one of an alkylamine, thiol fluoride or fluorine carbide into contact with the coating film,
   wherein the coating agent has a pH of no greater than 9, and
   the polymerizing agent contains a compound having two or more functional groups selected from the group consisting of an amino group and a mercapto group per molecule.

4. A process of forming a coating film, comprising:
   a step of preparing a coating agent comprising a main component containing a polyphenol derivative, a polymerizing agent and a buffer solution, and
   (i) a step of applying the coating agent onto a substrate in an alkaline environment having a pH of greater than 9 to form a coating film thereon, or
   (ii) a step of contacting the coating agent with an alkaline substrate having a pH of greater than 9 to form a coating film on at least a portion of a surface layer of a substrate,
   wherein the coating agent has a pH of no greater than 9, and
   the polymerizing agent contains a compound having two or more functional groups selected from the group consisting of an amino group and a mercapto group per molecule.

* * * * *